Jan. 28, 1930.  A. LEVEDAHL  1,744,976
SCREW OR NUT DRIVING DEVICE FOR POWER OPERATED TOOLS
Filed Oct. 6, 1927  3 Sheets-Sheet 1
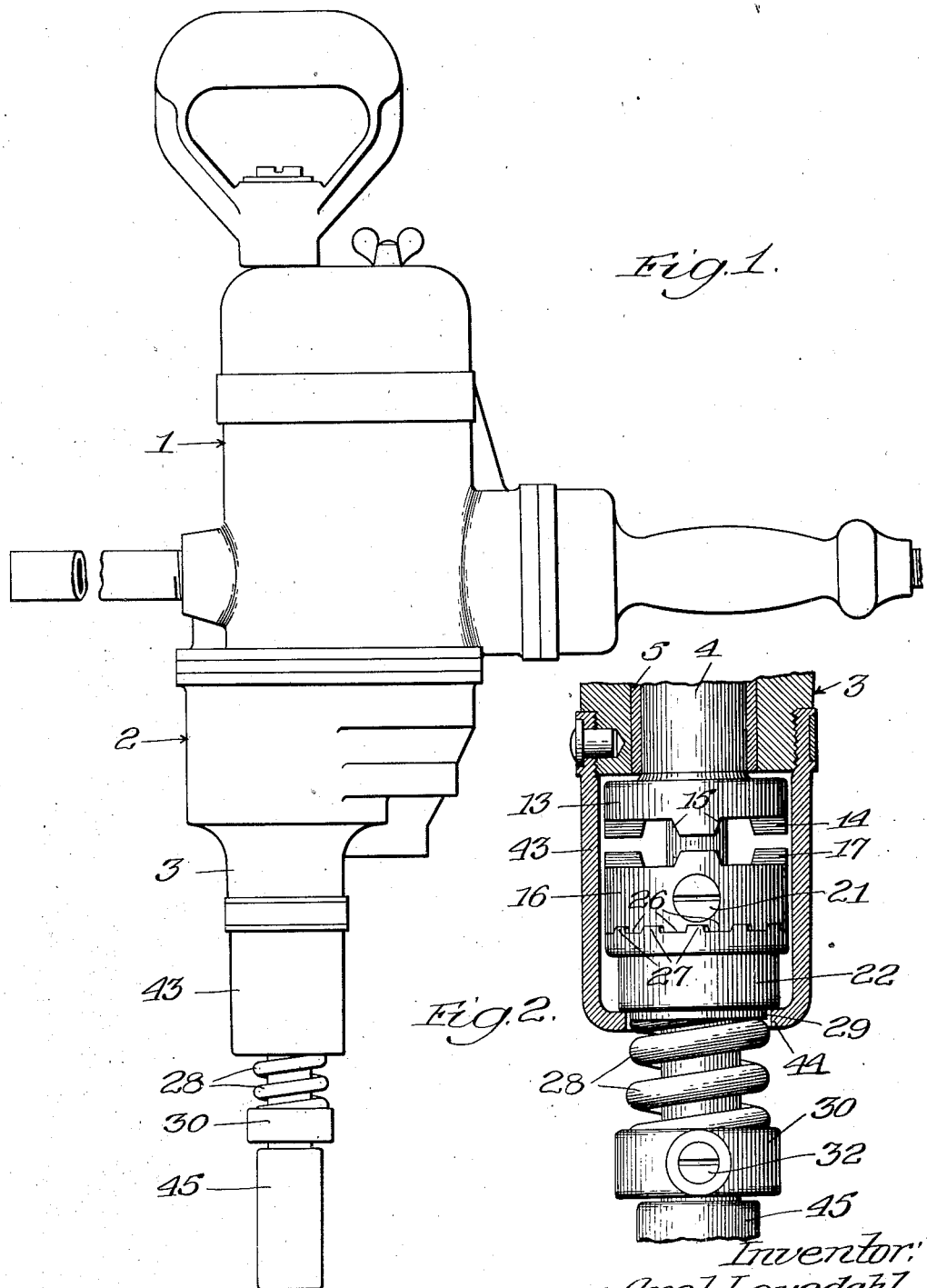

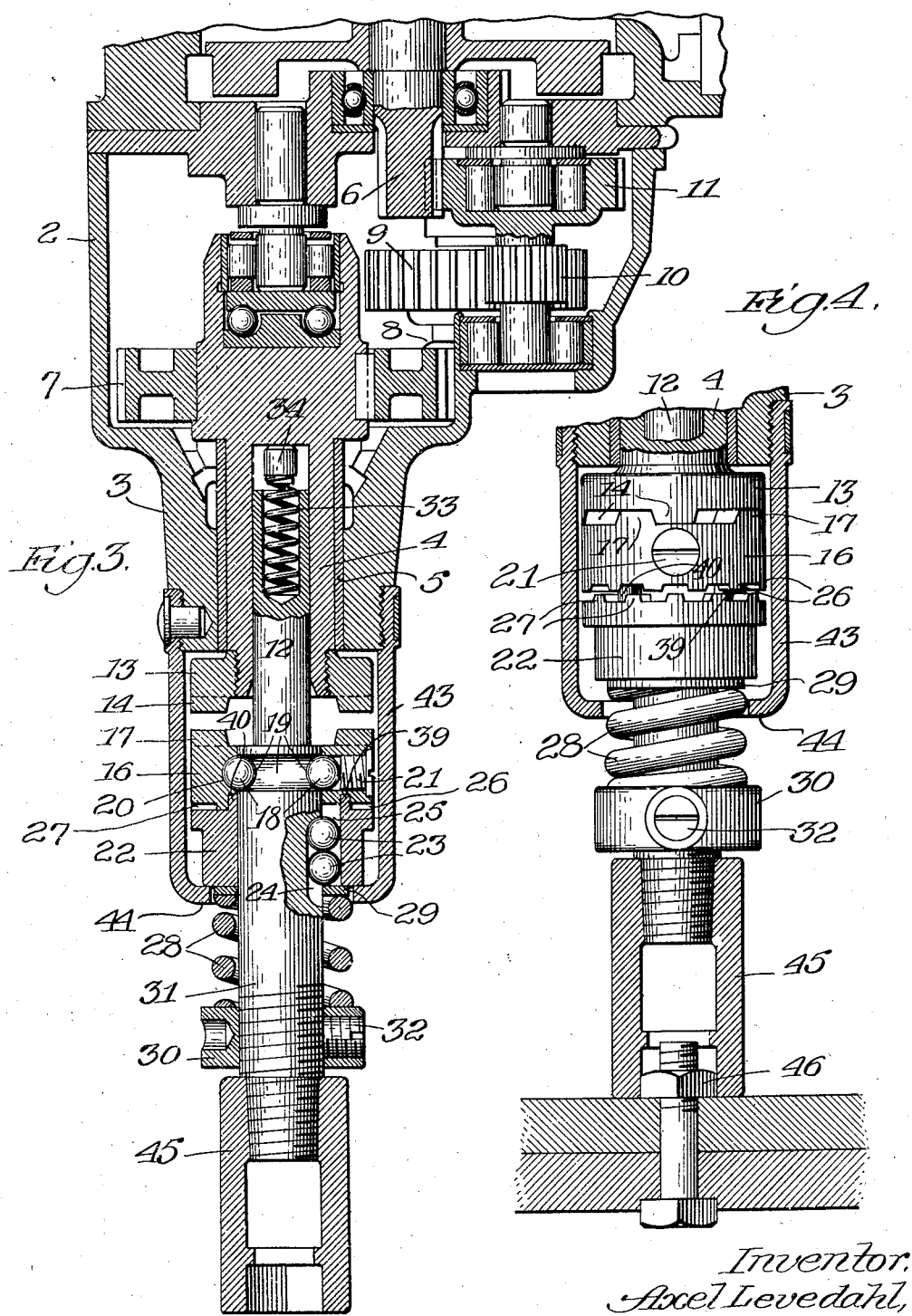

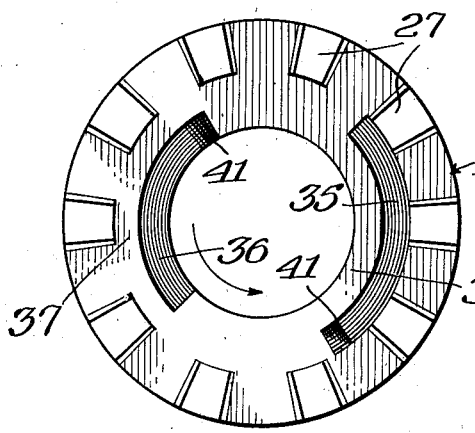
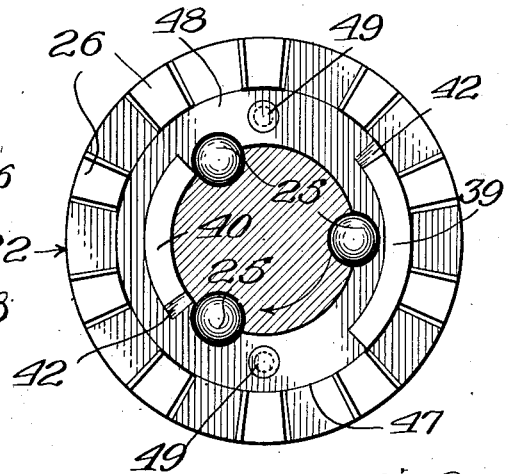
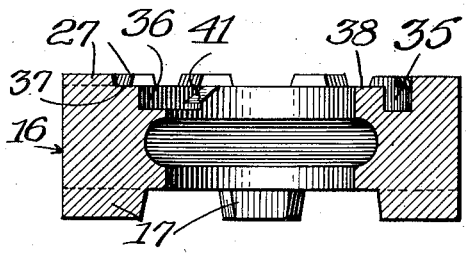
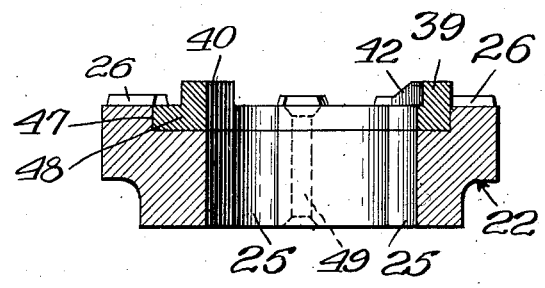
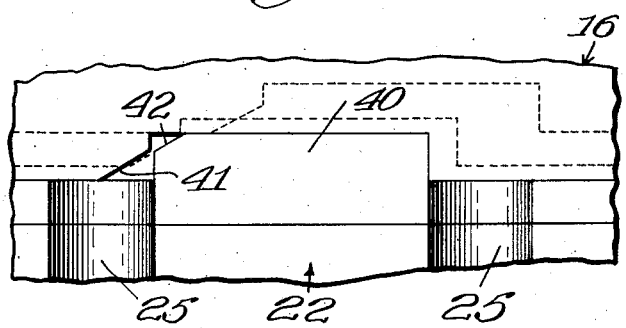

Patented Jan. 28, 1930

1,744,976

UNITED STATES PATENT OFFICE

AXEL LEVEDAHL, OF AURORA, ILLINOIS, ASSIGNOR TO INDEPENDENT PNEUMATIC TOOL COMPANY, OF CHICAGO, ILLINOIS, A CORPORATION OF DELAWARE

SCREW OR NUT DRIVING DEVICE FOR POWER-OPERATED TOOLS

Application filed October 6, 1927. Serial No. 224,372.

This invention relates to improvements in screw or nut driving devices or attachments for portable power driven tools whereby screws and nuts may be rapidly and tightly set by power.

In my copending application Serial No. 221,602, filed September 23, 1927, now issued as Patent No. 1,684,633, dated September 18, 1928, I have disclosed and claimed a device for this purpose in which main and supplemental clutches are employed between the driving shaft of the device and the rotary spindle of the tool. Each clutch embraces separable clutch members with co-operating clutch teeth. When all of the teeth of the clutches are engaged, the spindle drives or rotates the shaft to set screws or nuts by power, a suitable screw driving bit being secured to the outer end of the shaft for screws, and a nut engaging socket being employed for nuts. The teeth of the supplemental clutch are cut at such an angle that they will slip the moment the screw or nut becomes set or tightened to the proper tension so as to release the shaft from the spindle without stopping the rotation of the spindle or being required to withdraw the tool from the work to separate the teeth of the main clutch. The teeth of the supplemental clutch are made relatively small as compared with those of the main clutch so as to reduce the opening movement of the supplemental clutch as the teeth disengage and thus lessen the vibration on the tool and the operator holding the same. Moreover, the teeth of the supplemental clutch are greater in number than those of the main clutch and are much narrower so as to reduce to the minimum the shock as the teeth momentarily engage as they slip over each other. At the high speeds at which tools of this character are run, the teeth of the supplemental clutch slip over each other rapidly many times each time a screw or nut is set, which is many times during the course of a day's work especially on large production jobs. This rapid and repeated slipping of the teeth is likely to wear the corners of the teeth to an unnecessary degree. Moreover, each time the teeth momentarily reengage as they slip or ratchet over each other, the torque of the rotating spindle is suddently and intermittently transferred to the tool and the operator holding the tool must resist it. With the teeth small and slipping quickly, these torque strains are not sufficient to bother or tire the operator, but they are present to a slight degree.

One object of my present invention is to provide means which will automatically effect a complete separation of the supplemental clutch or of the main clutch, if only one clutch is employed, the moment the screw or nut is set, and prevent any wear on the clutch teeth by holding them apart and preventing them from slipping or ratcheting over each other as heretofore.

A further object of my invention is to provide this means in the form of co-acting parts on the clutch members so as to keep the device compact in form.

A further object of my invention is to provide this means in the form of co-acting arcurate grooves and projections on the respective clutch members, the projections extending outward from the associated clutch member a distance greater than the teeth so as to effect a complete separation of the teeth and hold them apart when the projections ride out of the grooves in the action of the device.

A further object of my invention is to provide a strong and efficient device which will be applicable for small as well as larger and heavier sizes of tools as required for setting the larger sizes of screws and nuts.

The invention consists further in the matters hereinafter described and claimed.

In the accompanying drawings—

Fig. 1 shows a portable power driven tool equipped with the device of my invention;

Fig. 2 has the guard or sleeve for the clutches in vertical section to show the clutches;

Fig. 3 is an enlarged vertical sectional view through the device and associated parts of the tool;

Fig. 4 is a view similar to Fig. 2 and shows the main clutch closed and the supplemental clutch held open by the means of my invention;

Figs. 5 and 6 are face views of the members of the supplemental clutch to show the clutch separating means of my invention;

Figs. 7 and 8 are sectional views taken through these clutch members on lines 7—7 and 8—8, respectively, of Figs. 5 and 6; and Fig. 9 is a diagrammatic view showing the action of one of the projections of my device.

In the drawings, I have shown the device or attachment of my invention applied to a portable electric drill, which has connected motor and gear cases 1 and 2, with a tubular extension 3 on the forward end of the gear case and in which extension is journaled the rotary spindle 4 of the tool with a bearing bushing 5 about the spindle in the extension, as shown in Fig. 3. The spindle 4 is driven from the armature shaft 6 of the motor of the tool through a speed reducing gearing which is located in the case 2 and comprises a gear 7 fixed on the upper end of the spindle 4 and meshing with a pinion 8 carried by a gear 9. The latter meshes with a pinion 10 carried by a gear 11 which meshes with gear teeth on the armature shaft 6 where it extends into the case 2.

The device or attachment of my invention comprises a shaft 12, which has its inner end extending into and slidably and rotatably supported in the spindle 4, the latter being made hollow for the purpose. The outer end of the spindle 4 extends beyond the extension 3 and there is provided with an annular clutch member 13, which has on its outer face a plurality of jaws or clutch teeth 14 having inclined side faces 15, as shown in Figs. 2 and 4. The clutch member 13 is screwed or keyed on the outer end of the spindle 4 and turns with the spindle when the latter is rotated by the armature shaft 6 of the motor during the operation of the tool.

A similar clutch member 16 is located on the shaft 12 just beyond the clutch member 13 and has on its inner face a plurality of jaws or clutch teeth 17 made and arranged similar to the clutch teeth 14 and adapted to engage the same on pressing the tool against the work. (See Fig. 4.) The clutch member 16 is rotatably connected with the shaft 12 by means of a number of balls 18, 18 fitting half in each of circumferential grooves 19, 20 in the clutch member 16 and shaft 12, respectively, as shown in Fig. 3. A screw plug 21 normally closes the hole in the clutch member 16 through which the balls 18 are inserted into the grooves in assembling the parts.

A third clutch member 22 is splined or slidably mounted (within limits) on the shaft 12 beyond the clutch member 16. This slidable connection is made through the provision of three sets of ball keys 23, 23 located half in each of longitudinal grooves 24, 25 in the shaft 12 and clutch member 22, respectively. Each set of keys preferably comprises a pair of balls 23, and the three sets of balls and their grooves are spaced apart circumferentially about the clutch member 22, as shown in Fig. 6.

The opposed faces of the clutch members 16 and 22 have co-operating jaws or clutch teeth 26, 27, respectively. The teeth 26 are arranged to fit within the spaces between the teeth 27 and have their engaging side faces inclined so that they may slip to disengage the clutch members 16 and 22, when one member is turned with respect to the other in a manner to be presently described.

A relatively heavy coiled spring 28 surrounds the shaft 12 beyond the clutch member 22. This spring has its inner end against a washer 29 at the outer end of the clutch member 22, and has its outer end bearing against a nut 30 screwed on the threaded portion 31 of the shaft 12. By this construction, the nut may be adjusted along the shaft 12 to regulate the tension of the spring 28 and thus set the torque at which the teeth 26, 27 of the clutch members 16, 22 will disengage on the setting of a screw or nut. A set screw 32 carried by the nut is used to set the nut in its position of adjustment along the shaft. The washer 29 serves to close the outer ends of the grooves 25 so that the balls 23 can not work or drop out of the same. The inner ends of these grooves are closed by the clutch member 16, as shown in Fig. 3.

The clutch members 13 and 16 are normally held disengaged or apart by a coiled spring 33 fitted in a hollow at the upper or inner end of the shaft 12. The inner end of this spring carries a plug 34 which is forced by the spring against the inner end of the hollow in the spindle 4. The spring 33 urges the shaft 12 outward from the spindle 4 and thus normally maintains the clutch members 13, 16 disengaged or apart, while the spring 28 normally holds the clutch member 22 engaged with the one 16, except when said latter clutch members are held apart by the automatic release of my invention, to be now described.

The clutch members 16, 22 are provided on their opposed surfaces with means which, the moment the screw or nut becomes set or tightened to the proper tension, will act to automatically move the clutch member 22 outward against its spring 28 a distance sufficient to completely disengage and separate the teeth 26, 27 of said members and positively hold the clutch members apart for substantially a complete revolution of the spindle 4 and immediately repeat the operation so that no opportunity is afforded for said teeth to slip or ratchet over each other to wear or break on releasing the shaft 12 from the spindle 4. The means referred to may take the form of coacting arcuate slots and projections on the respective clutch members arranged within the line of their teeth, as shown in Figs. 5 and 6.

As there shown, the teeth 26, 27 of the clutch members 16 and 22 do not extend clear across their opposed faces but are confined to their outer peripheries. This leaves the opposed surfaces of the members inside of the teeth flat except for the grooves and projections to be now described. The clutch member 16 is provided in this flat surface with two arcuate grooves 35, 36. These grooves are diametrically or oppositely disposed and are milled in the member 16 with the groove 35 just inside the row of teeth 27 and with the groove 36 at or close to the center hole or more in the member through which the shaft 12 extends. Both grooves are cut on the same degree, and the inner groove 36, which is nearer the center, is shorter than the outer groove 35. The grooves 35, 36 are concentrically arranged with respect to the axial center of the member 16 but, being out of circumferential alignment, provide different trackways 37, 38 on the face of the member 16 for the arcuate projections 39, 40 on the other clutch member 22.

The projections 39, 40 are disposed on the face of the member 22 in the same relative positions as the grooves and, having the same shape as the grooves and being slightly shorter, enter the grooves when the clutch members 16, 22 go together for their teeth to engage, as shown in Fig. 3. The projections 39, 40 project outward from the member 22 a distance slightly greater than the total lift required to clear the teeth of the clutch members, and the groves 35, 36 are made deep enough to fully receive the projections when said clutch members are engaged. The projections 39, 40 should necessarily be a little shorter than the grooves in order not to interfere when the clutches 16, 22 snap together when the grooves and projections register.

At least one end of each groove 35, 36 is slightly beveled or inclined, as at 41 in Figs. 5 and 9, and the corresponding ends of the projections are also similarly inclined, as at 42 in Figs. 6 and 9. This is provided so that when the projections 39, 40 are forced against the ends of the grooves, as when the clutch member 16 is turned by the spindle 4 with respect to the clutch member 22, the inclines 41, 42 will cause the projections to ride out of the grooves onto the trackways 37, 38 and move the clutch member 22 from the one 16 for completely separating the teeth of said members. As the grooves 35, 36 are in the different trackways 37, 38, the clutch members 16, 22 are held apart for approximately one full revolution of the clutch member 16, because the projections 39, 40 can not enter their grooves until after they have traveled around their respective tracks for one revolution. When this occurs, the projections enter the grooves and the teeth 26, 27 engage. If the tool is still pressed against the work, the projections will immediately ride out of the grooves and the teeth will again be separated and be held apart for another revolution and the action repeated until the tool is withdrawn. By this action, the teeth 26, 27 would only momentarily engage once in each revolution, and thus can not ratchet or slide over each other to wear or break, as heretofore.

A sleeve 43 is attached to the outer end of the extension 3 and projects beyond the same and forms a protecting housing or guard about all of the clutches of the device. The lower end of the sleeve is turned inward to provide a circular flange 44, which projects over the clutch member 22 and limits the outward movement of the shaft 12 by the spring 33. This flange also prevents said shaft from working or dropping out of the spindle 4.

A socket 45 is shown secured to the outer end of the shaft 12 to fit over a nut, as 46, to be set or tightened by the tool. For driving screws, a suitable holder for a screw driving bit will be applied to the shaft 12 in place of the socket 45. Sockets 45 of different sizes will be used for the different sizes and shapes of nuts to be operated on, and the same is true with respect to the driving bits for the different sizes of screws.

In operation, the operator grasps and holds the tool by its handles, turning on the current to the motor of the tool through a suitable switch to set the tool in operation, and then applies the socket 45 over the nut 46 to be set. The main clutches 13, 16 are at this time disengaged or separated (by spring 33) and the supplemental clutches 16, 22 have their teeth engaged, if the projections 39, 40 are in the grooves 35, 36. (See Fig. 2.) The clutch member 22 is held against the flange 44 by the spring 33, and the shaft 12, socket 45, and clutch members 16 and 22 are not rotated by the rotating spindle 4 at this time. The operator now forces or presses the tool against the work, thereby closing up the clutches 13, 16 and connecting the shaft 12 to the rapidly rotating spindle 4, the projections 39, 40 quickly entering the grooves 35, 36 (if not already there) so that the teeth of all of the clutches will be engaged to turn the shaft by the spindle. In pressing the tool against the work, the flanged end 44 of the guard or sleeve 43 is moved forward out of contact with the clutch member 22 (Fig. 4), so that the latter may yield against its spring 28 when the projections 39, 40 ride out of the grooves to separate the teeth of the clutch members 16, 22. This takes place the moment the nut becomes set to the proper tension. The tightened nut resists further turning of the shaft 12 and the clutch member 22, and as a result the clutch member 16 continues to rotate with the spindle 4. The teeth 26 of the member 16 begin to slide over those (27) of the member 22 and force the latter outward against the spring 28. Up to this point the automatic release has been inactive, as the projections 39, 40 are still in the grooves 35, 36. By the time the inclined faces of the teeth 26, 27 have cleared and the outer ends of the teeth are resting on one another, the beveled ends 41 of the grooves 35, 36 have been moved into contact with the beveled ends 42 of the projections 39, 40 and the member 22 is forced further outward from the member 16 to lift the teeth completely out of contact and completely release the shaft from the spindle. The teeth are held out of contact for one full revolution of the spindle minus the play between the width of the teeth. When the spindle about completes this revolution and the teeth pass over each other the last time and before the teeth on member 16 have quite reached the space between the teeth on member 22, the projections 39, 40 drop into the grooves 35, 36 and the teeth of the members will come together. There is a little space or clearance between these teeth (Fig. 2) in order to give time for the clutches to close. The tool may be withdrawn from the work before this revolution is complete. If not, the teeth momentarily engage and are again separated by the projections riding out of the grooves and onto the trackways 37, 38.

With the bevel or taper at only one end of each projection and groove, the other end is left square and a positive hold is provided between the projections and grooves for unscrewing screws and nuts by the tool when the rotation of the spindle is reversed, as may be done with reversible tools. When the device is made to set both right and left-handed screws and nuts, both ends of the grooves and projections will be beveled.

The projections 39, 40 may be made integral with the clutch member 22, or they may be made independent of said member and afterward secured thereto as shown in Figs. 6 and 8. As there illustrated, an annular recess 47 is turned in the face of the member 22 between its teeth and its bore. On a ring 48 which is set in this recess are made the projections 39, 40. The ring is secured in the recess in any suitable manner, rivets 49, 49 being shown for the purpose in Fig. 8.

With the teeth completely separated and held apart, the shaft 12 is fully released from the rotating spindle, and thus the operator is not subjected to torque strains as heretofore. This relieves the operator of any possibility of tire by torque strains, and thus the tool may be handled and operated for long periods of time. When the projections 39, 40 ride out of the grooves, there is a slight click, which gives audible indication to the operator that the nut or screw has become set, and he may then quickly withdraw the tool and apply it to the next screw or nut to be set, and so on through the day's work. I find that a bevel or incline of 20 degrees for the teeth 26, 27 and of 15 degrees for the ends of the grooves and projections give satisfactory results. The incline on the teeth of the main clutch will be such that said teeth will not disengage except at a torque greater than that required to disengage the teeth of the supplemental clutch. The three clutch members 13, 16 and 22 are axially aligned on the shaft and the spindle and form the innermost, intermediate and outermost members respectively of the clutch assembly. The intermediate member 16 cooperates with the innermost and the outermost members 13 and 22 and forms therewith main and supplemental clutches, respectively. The main clutch is the driving clutch while the supplemental clutch automatically releases the shaft from the positive drive of the spindle on the development of a predetermined torsional stress between the members of the supplemental clutch through the tightening of the screw or nut without requiring a release of the main clutch. This allows the continued rotation of the spindle to effect an automatic re-engagement of the teeth of the supplemental clutch as soon as the members thereof reach their single position of rotative engagement. This automatically sets the clutch assembly for further screw driving or nut tightening operations without being required to stop the motor of the tool or slow down its speed of rotation.

The details of structure and arrangement of parts shown and described may be variously changed and modified without departing from the spirit and scope of my invention.

I claim as my invention:

1. In a portable motor driven tool having a rotary spindle, a screw or nut driving device rotatably supported by the spindle, clutch means including separable clutch members having a plurality of teeth all of which interengage when driving the device by the spindle, said clutch members being constructed to permit interengagement of all of the teeth thereof in a single rotative position of said members and operable upon the development of a predetermined torsional stress between them through the tightening of the screw or nut to automatically separate the members and maintain their teeth out of positive driving engagement for substantially a full revolution of the spindle, and means acting through the continued rotation of the spindle for effecting the automatic re-engagement of all of the teeth of said members as soon as the latter reach said single position of rotative engagement.

2. In a portable motor driven tool having a rotary spindle, a screw or nut driving device rotatably supported by the spindle, clutch means including separable clutch members having a plurality of teeth all of which are interengaged when driving the device by the spindle, said clutch members being constructed to permit interengagement of all of the teeth thereof in a single rotative position of said members and operable upon the development of a predetermined torsional stress between said teeth through the tightening of the screw or nut to automatically separate the clutch members and maintain their teeth out of positive driving engagement for substantially a full revolution of the spindle, and means acting through the continued rotation of the spindle for effecting the automatic re-engagement of all of the teeth of said members as soon as the latter reach said single position of rotative engagement, said means being adjustable for determining said torsional stress.

3. In a portable motor driven tool having a rotary spindle, a screw or nut driving device rotatably supported by the spindle, clutch means including separable clutch members having clutch teeth which interengage when driving the device by the spindle, said members having means permitting the teeth thereof to interengage in a single rotative position of said members and operable upon the development of a predetermined torsional stress between them through the tightening of the screw or nut to automatically separate the clutch members and hold their teeth out of positive driving engagement for substantially a full revolution of the spindle to relieve said teeth of wear and the operator holding the tool of the torque of the rotating motor, said means acting through the continued rotation of the spindle for effecting the automatic reengagement of said teeth which by their reengagement will warn the operator to withdraw the tool from the work.

4. In a portable motor driven tool having a rotary spindle, a screw or nut driving device having a shaft slidably and rotatably supported by said spindle, three axially aligned clutch members having engageable clutch teeth, the innermost and the outermost of said members having fixed and splined connections respectively with the spindle and the shaft, the intermediate member being rotatably connected with the shaft and adapted to cooperate with the other two members to form main and supplemental clutches, the intermediate and the outermost members being constructed to permit the teeth thereof to interengage in a predetermined rotative position of said members and operable upon the development of a predetermined torsional stress between them through the tightening of a screw or nut to automatically separate said members and hold their teeth out of positive driving engagement for substantially a full revolution of the spindle while the main clutch is engaged, means acting through the continued rotation of the spindle while the main clutch is engaged to effect the automatic reengagement of the supplemental clutch, and means acting to move the shaft outward from the spindle to normally hold the main clutch disconnected and operable on the inward movement of the shaft to effect connection of the main clutch.

5. In a portable motor driven tool having a rotary spindle, a screw or nut driving device having a shaft rotatably supported by said spindle, three axially aligned clutch members having engageable clutch teeth, the innermost and the outermost of said members having fixed and splined connections respectively with the spindle and the shaft, the intermediate member being rotatably connected with the shaft and adapted to cooperate with the other two members to form main and supplemental clutches, the intermediate and the outermost members being constructed to permit the teeth thereof to interengage in a single rotative position of said members and operable upon the development of a predetermined torsional stress between them to automatically separate said members and hold their teeth out of positive driving engagement for substantially a full revolution of the spindle while the main clutch is engaged, and means acting through the continued rotation of the spindle while the main clutch is engaged to effect the automatic reengagement of the supplemental clutch, said means being adjustable for determining said torsional stress.

6. In a portable motor driven tool having a rotary spindle, a screw or nut driving device rotatably supported by the spindle, clutch means including separable clutch members having a plurality of teeth all of which interengage when driving the device by the spindle, said clutch members being constructed to permit interengagement of all of the teeth thereof in a single rotative position of said members and operable upon the development of a predetermined torsional stress between them through the tightening of the screw or nut to automatically separate the members and maintain their teeth out of positive driving engagement for a predetermined angular movement of the spindle to give the operator time to remove the device from the work before the clutch is reengaged, and means acting through the continued rotation of the spindle for effecting the automatic reengagement of all of the teeth of said members as soon as the latter reach said single position of rotative engagement.

In testimony whereof I affix my signature.

AXEL LEVEDAHL.